US011447173B2

(12) United States Patent
Wilkes

(10) Patent No.: US 11,447,173 B2
(45) Date of Patent: Sep. 20, 2022

(54) TORQUE FEEDBACK ASSEMBLY FOR A VEHICLE STEERING COLUMN

(71) Applicant: ZF AUTOMOTIVE UK LIMITED, Solihull (GB)

(72) Inventor: Mark Anthony Wilkes, Birmingham (GB)

(73) Assignee: ZF Automotive UK Limited

(*) Notice: Subject to any disclaimer, the term of this patent is extended or adjusted under 35 U.S.C. 154(b) by 184 days.

(21) Appl. No.: 17/070,218

(22) Filed: Oct. 14, 2020

(65) Prior Publication Data

US 2021/0107557 A1    Apr. 15, 2021

(30) Foreign Application Priority Data

Oct. 14, 2019   (GB) ........................... 1914859

(51) Int. Cl.
  *B62D 5/00*   (2006.01)
(52) U.S. Cl.
  CPC .................... *B62D 5/006* (2013.01)
(58) Field of Classification Search
  CPC ............................................. B62D 5/006
  USPC ................................................ 180/402
  See application file for complete search history.

(56) References Cited

U.S. PATENT DOCUMENTS

| 10,479,399 | B2* | 11/2019 | Beyerlein | B62D 5/04 |
| 10,953,912 | B2* | 3/2021 | Rawlings | B62D 6/008 |
| 11,254,348 | B2* | 2/2022 | Niwa | B62D 6/008 |
| 2017/0361867 | A1* | 12/2017 | Lewis | B62D 5/006 |
| 2019/0020492 | A1 | 1/2019 | Boutros et al. | |
| 2020/0172150 | A1* | 6/2020 | Wilkes | B62D 5/0409 |

FOREIGN PATENT DOCUMENTS

| CN | 108583676 B | 11/2019 |
| DE | 10103667 A1 | 8/2002 |

* cited by examiner

*Primary Examiner* — Kevin Hurley
*Assistant Examiner* — Hosam Shabara
(74) *Attorney, Agent, or Firm* — Robert James Harwood

(57) ABSTRACT

A steering torque feedback assembly for a vehicle steering column includes a housing, a crown wheel of a hypoid gear assembly rotatably mounted in the housing and being configured to rotate with, or being connected to, a vehicle steering column, and first and second electric motors within the housing, each having a rotatable output shaft, wherein the output shaft of each of the first and second motors comprises a hypoid pinion gear engaged with the hypoid crown wheel.

9 Claims, 2 Drawing Sheets

TORQUE FEEDBACK ASSEMBLY FOR A VEHICLE STEERING COLUMN

CROSS-REFERENCE TO RELATED APPLICATION

This application claims priority to UK Patent Application No. 1914859.2 filed Oct. 14, 2019, the disclosure of which is incorporated herein by reference in its entirety.

TECHNICAL FIELD

The present disclosure relates to torque feedback assemblies for a vehicle steering column and in particular, but not exclusively, to such assemblies for use with a steer-by-wire hand wheel actuator.

BACKGROUND

Autonomous vehicles are intended to be used primarily in an autonomous mode, in which control of the vehicle is carried out without manual intervention. However, it is desirable for autonomous vehicles to be controllable manually if necessary or desired, and for that reason, vehicle controls such as a steering wheel (typically having a "steer-by-wire" operation) must be provided.

In such steer-by-wire arrangements, a hand wheel (steering wheel) is connected to one end of a shaft whose angular displacement is measured to generate a signal which is used to control the orientation of the steering wheels of the vehicle. The arrangement is commonly also provided with an electric motor connected to the shaft in order to provide a sensation of road feel to the driver.

In such arrangements, an electric motor typically drives a worm screw engaged with a worm gear which rotates with the shaft to which the steering wheel is connected. It is desirable to take steps to bias the worm screw into engagement with the worm gear in order to reduce gear rattle which occurs when the torque and direction of the motor are reversed.

The present disclosure seeks to overcome or reduce the problems associated with the prior art arrangements. In accordance with the present disclosure, a steering torque feedback assembly for a vehicle steering column comprises: a housing; a crown wheel of a hypoid gear assembly; and first and second electric motors.

The crown wheel of a hypoid gear assembly may be rotatably mounted in the housing and may be configured to rotate with, or may be connected to, a vehicle steering column. The first and second electric motors may be disposed within the housing with each having a rotatable output shaft. The output shaft of each of the first and second motors includes a hypoid pinion gear engaged with the hypoid crown wheel. By using a hypoid gear assembly to connect the output of the electric motors to a steering column, it is possible to achieve a large gear ratio reduction without the need for additional gearing, resulting in a compact assembly.

The provision of two electric motors also allows the motor to be controlled in a first operational mode to apply torque in opposite directions to the crown wheel (and thereby to a steering column and a steering wheel), which eliminates the need to control backlash with precision components. In addition, the two motors can be controlled and a second operational mode to apply torque in the same direction to the output gear and allows the motors and gear components to be specified at half the rating of the required total system talk, thereby reducing the size and cost of the assembly. Preferably, the rotational axis of the output shaft of each of the first and second motors extends perpendicularly to the rotational axis of the crown wheel.

SUMMARY

In a preferred embodiment, the rotational axes of the first and second motors are inclined with respect to each other. Preferably, the first and second motors are located adjacent to each other. This results in a compact assembly which facilitates mounting it on a vehicle. In a preferred embodiment, the rotational axes of the first and second motors are inclined with respect to each other at an angle of ≤90°. In one embodiment, the rotational axes of the first and second motors are inclined with respect to each other at an angle of approximately 60°. Preferably, the crown wheel comprises an aperture aligned with its axis of rotation.

Preferably, the aperture comprises means for a keyed connection with a complementarily-shaped portion of a steering column.

A keyed connection ensures that the steering column rotates with the crown wheel and that the output of the motors is therefore transferred to the steering column and to the steering wheel connected to the opposite end of the steering column, whilst allowing longitudinal adjustment of the steering column. In particular, in autonomous vehicles it is important that the steering column can be moved into a stowed condition during autonomous control of the vehicle in order to maximise the space available within the vehicle and also moved into an extended; deployed condition for manual control by a driver, Preferably, the aperture is splined. The present disclosure also includes a vehicle steering column comprising a steering torque feedback assembly in accordance with the present disclosure.

BRIEF DESCRIPTION OF THE DRAWINGS

By way of example only, a specific embodiment of the present disclosure will now be described with reference to the accompanying drawings; in which.

DETAILED DESCRIPTION

Figure 1:
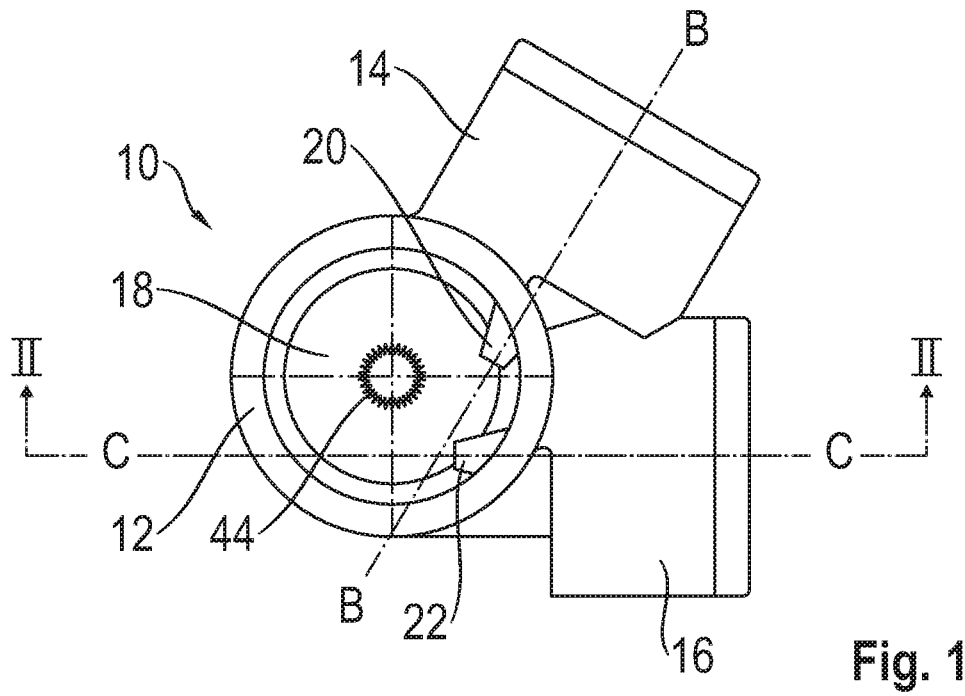
FIG. 1 is a front view of an embodiment of steering torque feedback assembly in accordance with the present disclosure.

A steering torque feedback assembly 10 comprises a housing having a main cylindrical, tubular, hypoid crown wheel housing portion 12 and two cylindrical tubular torque motor housing portions 14, 16 extending outwardly from the outer surface of the main housing portion 12. A hypoid crown gear 18 of a hypoid gear assembly is rotatably mounted on bearings within the main housing portion 12 about an axis A-A which is coincident with the longitudinal axis of the tubular housing portion 12 and is engaged with each of two identical hypoid pinion gears 20, 22 connected to respective output shafts 24, 26 of identical torque feedback motors 28, 30 rotatable about axes B-B and C-C respectively.

Figure 2:
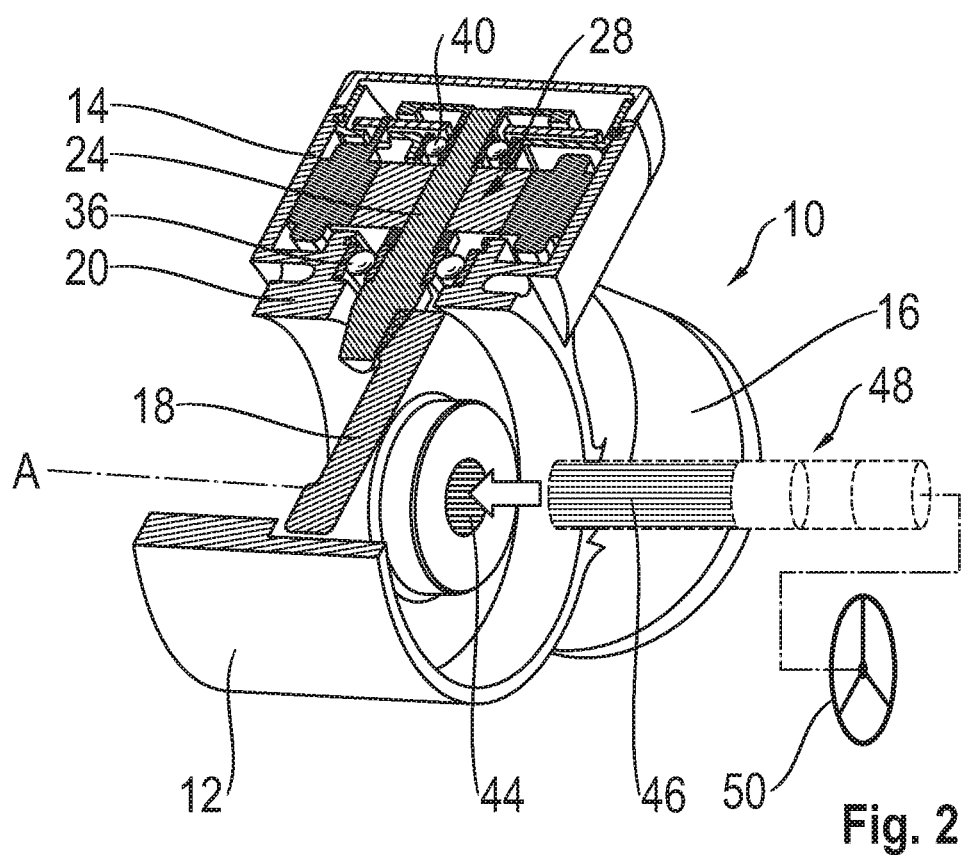
FIG. 2 is a rear perspective view of the steering torque feedback assembly of FIG. 1, partially sectioned looking in the direction of arrows II-II of FIG. 1.
Figure 3:
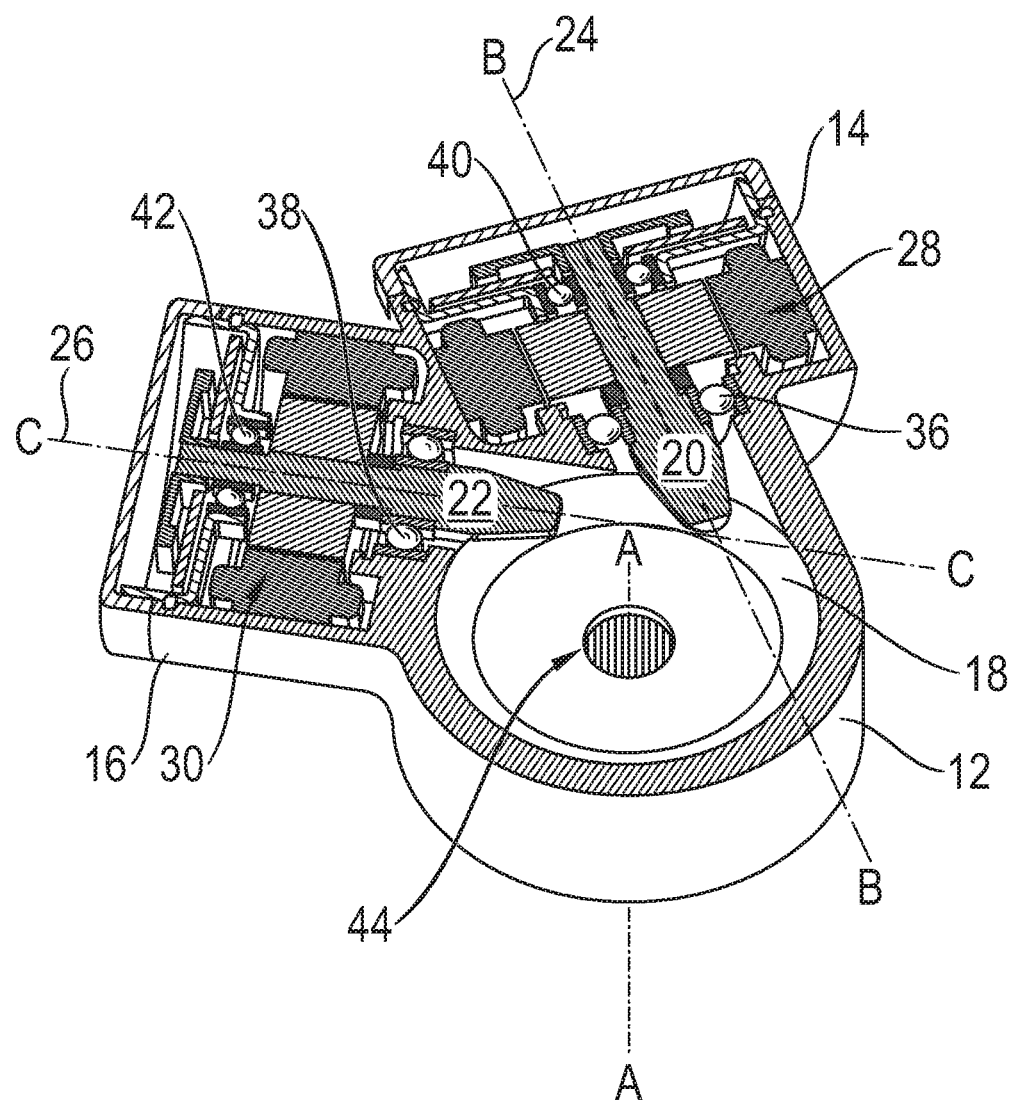
FIG. 3 is a vertical transverse cross sectioned perspective view of the steering torque feedback assembly of FIG. 1.

The crown gear 18 and the hypoid pinion gears 20, 22 form a hypoid gear assembly, whereby the rotational axis A-A of the crown gear 18 does not intersect with the rotational axes B-B and C-C of the hypoid pinion gears 20, 22. As best seen in FIG. 1, the rotational axes B-B and C-C of the hypoid pinion gears are inclined with respect one another by 60°, with the consequence that the engagement areas between the hypoid pinion gears 20, 22 and the hypoid crown gear 18 are angularly spaced from each other by the same amount. However, the rotational axes B-B and C-C of the two hypoid pinion gears 18, 20 extend perpendicularly to the rotational axis A-A of the hypoid crown gear 18. As best seen in FIGS. 2 and 3, the output shaft 24, 26 of each of the torque feedback motors 28, 30 is rotatably mounted between a first bearing 36, 38 located adjacent to the respective pinion gear 20, 22 and a second bearing 40, 42 located adjacent to the opposite end of the respective output shaft 24, 26.

As shown in the figures, the hypoid crown gear 18 is provided with a splined circular aperture 44 at its centre and, in use, is configured to receive a complementary externally-splined portion 46 of a vehicle steering column 48 (both shown schematically). In use, a steering wheel (shown schematically at 50) is connected to the opposite end of the steering column. The splined connection between the hypoid crown gear 18 and the vehicle steering column 48 ensures that they rotate together, but allows for longitudinal displacement of the steering column 48 between an extended, operational position in a steer-by-wire mode and a retracted, non-operational position in an autonomous mode. The torque feedback motors 28, 30 are under the control of an electronic control unit (not shown) to apply torque to the hypoid crown gear 18, and thereby to the steering column 48 and to the steering wheel 50 attached to the steering column, in a steer-by-wire mode, to provide a sensation of road feel to a driver of the vehicle.

In use, a splined portion 46 at one end of a steering column 48 is positioned in the complementarity-splined aperture 44 in the hypoid crown gear 18 and the steering wheel 50 is connected to the opposite end of the steering column. In the extended, operational position of the steering column 48, the angular displacement of the steering wheel 50 is measured to generate a signal which is used to control the orientation of the steered wheels of the vehicle. In this mode, the torque feedback motors 28, 30 can be controlled the first operational mode to apply torque in opposite directions to the hypoid crown gear 18, which eliminates the need to control backlash with precision components. In addition, the two motors can be controlled in a second operational mode to apply torque in the same direction to the hypoid crown gear 18 and allows the motors and gear components to be specified at half the rating of the required total system torque, thereby reducing the size and the cost of the assembly. In each of these modes, the application of torque to the hypoid crown gear 18, and thereby to the steering column 48 and steering wheel 50, provides a sensation of road feel to a driver of the vehicle.

In the retracted, stowed position of the steering column, when the vehicle is driven in an autonomous mode, the torque feedback motors 28, 30 are not actuated, since there is then no need to provide a sensation of road feel to the steering wheel. However, the provision of the splined aperture 44 in the hypoid crown gear 18 accommodates the inner end of the steering column when in the retracted, stowed condition.

The disclosure is not restricted to the details of the foregoing embodiment.

What is claimed is:

1. A steering torque feedback assembly for a vehicle steering column, comprising:
    a housing;
    a crown wheel of a hypoid gear assembly rotatably mounted in the housing and being configured to rotate with, or being connected to, a vehicle steering column;
    first and second electric motors within the housing, each having a rotatable output shaft;
    wherein the output shaft of each of the first and second motors comprises a hypoid pinion gear engaged with the hypoid crown wheel.

2. A steering torque feedback assembly as defined in claim 1, wherein the rotational axis of the output shaft of each of the first and second motors extends perpendicularly to the rotational axis of the crown wheel.

3. A steering torque feedback assembly as defined in claim 2, wherein the rotational axes of the first and second motors are inclined with respect to each other.

4. A steering torque feedback assembly as defined in claim 3, wherein the first and second motors are located adjacent to each other.

5. A steering torque feedback assembly as defined in claim 4, wherein the rotational axes of the first and second motors are inclined with respect to each other at an angle of ≤90°.

6. A steering torque feedback assembly as defined in claim 5, wherein the rotational axes of the first and second motors are inclined with respect to each other at an angle of approximately 60°.

7. A steering torque feedback assembly as defined in claim 6, wherein the crown wheel comprises an aperture aligned with its axis of rotation.

8. A steering torque feedback assembly as defined in claim 7, wherein the aperture comprises means for a keyed connection with a complementarily-shaped portion of a steering column.

9. A steering torque feedback assembly as defined in claim 8, wherein the aperture is splined.

* * * * *